United States Patent
Zhao et al.

(10) Patent No.: US 7,073,127 B2
(45) Date of Patent: Jul. 4, 2006

(54) VIDEO EDITING GUI WITH LAYER VIEW

(75) Inventors: Bin Zhao, Hangzhou Zhejiang Province (CN); Rusong Fang, Hangzhou (CN); Lihong Wang, Hangzhou Zhejiang Province (CN)

(73) Assignee: ArcSoft, Inc., Fremont, CA (US)

( * ) Notice: Subject to any disclaimer, the term of this patent is extended or adjusted under 35 U.S.C. 154(b) by 463 days.

(21) Appl. No.: 10/188,463

(22) Filed: Jul. 1, 2002

(65) Prior Publication Data
US 2004/0001079 A1   Jan. 1, 2004

(51) Int. Cl.
*G09G 5/00* (2006.01)

(52) U.S. Cl. .................. 715/719; 715/723; 715/716; 725/41; 725/43

(58) Field of Classification Search ........ 715/716–726; 725/40–44
See application file for complete search history.

(56) References Cited

U.S. PATENT DOCUMENTS

| | | | | |
|---|---|---|---|---|
| 5,404,316 A | * | 4/1995 | Klingler et al. ............. | 715/723 |
| 5,442,744 A | * | 8/1995 | Piech et al. ............... | 715/500.1 |
| 5,467,288 A | * | 11/1995 | Fasciano et al. ............ | 715/716 |
| 5,732,184 A | * | 3/1998 | Chao et al. ................ | 386/55 |
| 5,781,188 A | * | 7/1998 | Amiot et al. .............. | 715/723 |
| 5,999,173 A | * | 12/1999 | Ubillos .................... | 715/724 |
| 6,154,600 A | * | 11/2000 | Newman et al. ............ | 386/4 |
| 6,204,840 B1 | * | 3/2001 | Petelycky et al. .......... | 715/500.1 |
| 6,317,142 B1 | * | 11/2001 | Decoste et al. ............ | 715/762 |
| 6,351,765 B1 | * | 2/2002 | Pietropaolo et al. ........ | 709/218 |
| 6,400,378 B1 | * | 6/2002 | Snook ..................... | 715/716 |
| 6,469,711 B1 | * | 10/2002 | Foreman et al. ........... | 715/723 |
| 6,606,105 B1 | * | 8/2003 | Quartetti .................. | 715/853 |
| 6,628,889 B1 | * | 9/2003 | Inoue ..................... | 386/52 |
| 6,650,826 B1 | * | 11/2003 | Hatta ..................... | 386/52 |
| 6,670,966 B1 | * | 12/2003 | Kusanagi .................. | 715/723 |
| 6,686,970 B1 | * | 2/2004 | Windle .................... | 348/584 |
| 2001/0008572 A1 | * | 7/2001 | Ohmori et al. ............. | 386/52 |
| 2003/0002851 A1 | * | 1/2003 | Hsiao et al. ............... | 386/52 |
| 2003/0091329 A1 | * | 5/2003 | Nakata et al. ............. | 386/52 |

OTHER PUBLICATIONS

Studio DV User's Guide , Version 1.0/GB Pinnacle Systems Inc. 1999 (www.pinnaclesys.com).*

(Continued)

*Primary Examiner*—Tadesse Hailu
(74) *Attorney, Agent, or Firm*—Patent Law Group LLP; David C. Hsia (57) ABSTRACT

A graphical user interface for editing a video story includes a storyboard pane, a timeline pane, and a layer pane. The storyboard pane displays video clips of the video story and their transitions. The timeline pane displays tracks including a video track, a video overlay track, a text track, an effect track, and at least one audio track. The layer pane displays layers of a selected video clip from the video track. Each layer displays one layer clip. The layer clip can be a video layer clip, a text layer clip, or an audio layer clip. The layers in the layer pane show how the layer clips overlay each other (or not) in time to compose the selected video clip. A user uses the storyboard pane and the timeline pane to layout the video story, and the layer pane to layout the video clips in the video story.

41 Claims, 12 Drawing Sheets

OTHER PUBLICATIONS

Simplifying Video Editing Using Metadata, ACM, Jun. 2002 (portal.acm.org).*

Video -Editing Software, Jan Ozer, PC Magazine, Apr. 23, 2002, 13 pages, downloaded from http://www.pcmag.com/print_article/0.3048,a=24681,00.asp.

* cited by examiner

VIDEO EDITING GUI WITH LAYER VIEW

FIELD OF THE INVENTION

This invention relates to video editing software, and more particularly to the graphical user interface for video editing software.

DESCRIPTION OF RELATED ART

The digital video editing process starts when a user imports media (e.g., videos, still-images, and audios) to a computer. The user can import media from many sources, including a camcorder and the Internet. Next, the user edits the video by trimming video clips to appropriate lengths, inserting transitions between, and adding special effects such as titles, logo overlays, and background audio tracks.

Most video editing programs assemble clips in a storyboard that looks like a picture book, with the clips in sequence. Many programs also include a timeline, which is a linear representation of the clips that simplifies production-wide effects like audio tracks and logo overlays.

In the final stage, the video is converted to the appropriate format (e.g., rendered), whether for streaming over the Internet, burning onto CD-R or DVD-R, or transferring back to a camera. Most editing programs manage the transfer of video back to a camera, and many also provide CD-R or DVD-R authoring tools.

Video editors can control a DV camera or deck so a user does not have to stop and start a camera by hand, and several programs also let a user capture multiple files at once (called batch capture). Since DV cameras stamp date and time information into the file, most video editors can identify the time code breaks that indicate scene changes and separate these into discrete scenes.

Like many creativity applications, video editing software is available in two classes: professional products and consumer products. Both classes provide a similar set of capturing, editing, and rendering features. However, professional programs seek to facilitate creative freedom while consumer programs stress operational simplicity. Most consumer programs favor highly structured interfaces with a limited number of audio and video tracks. For example, Pinnacle Studio Version 7's fixed interface offers two video and three audio tracks, with tabs that guide users through the process. By contrast, Adobe Premiere offers up to 99 audio and video tracks with multiple windows that can be positioned and resized at will.

As more and more consumers rush to create their own videos, what is needed is an interface for video editing software that is intuitive and easy to use for the consumers.

SUMMARY OF THE INVENTION

In one embodiment of the invention, a graphical user interface for editing a video story includes a storyboard pane, a timeline pane, and a layer pane. The storyboard pane displays video clips of the video story and transitions between the video clips. The timeline pane displays a number of tracks of the video story. The tracks include a video track for displaying the video clips, a video overlay track for displaying video overlay clips, a text track for displaying text clips, an effect track for displaying effects, and at least one audio track for displaying audio clips. The layer pane displays a number of layers of a selected video clip from the video track. Each layer displays one layer clip. The layer clip can be a video layer clip, a text layer clip, or an audio layer clip. The layers in the layer pane show how the layer clips overlay each other (or not) in time to compose the selected video clip. In one embodiment, a user uses the storyboard pane and the timeline pane to layout the video story, and the layer pane to layout the video clips in the video story.

DETAILED DESCRIPTION

In one embodiment, a video story (e.g., a movie) is composed of individual tracks, including a video track, a video overlay track, an effect track, a text track, and one or more audio tracks. Each track is composed of "clips". For example, a video track is composed of video clips and transitions between video clips. In one embodiment, each video clip is composed of individual tracks (hereafter called "layers" to distinguish against the tracks of the video story), including one or more video layers, one or more audio layers, one or more text layers. Unlike a track, each layer is composed of only one clip (hereafter called a "layer clip" to distinguish against the clips of the tracks). For example, each video layer is composed of one video layer clips. A video layer clip can contain a video or a still image.

Figure 1:
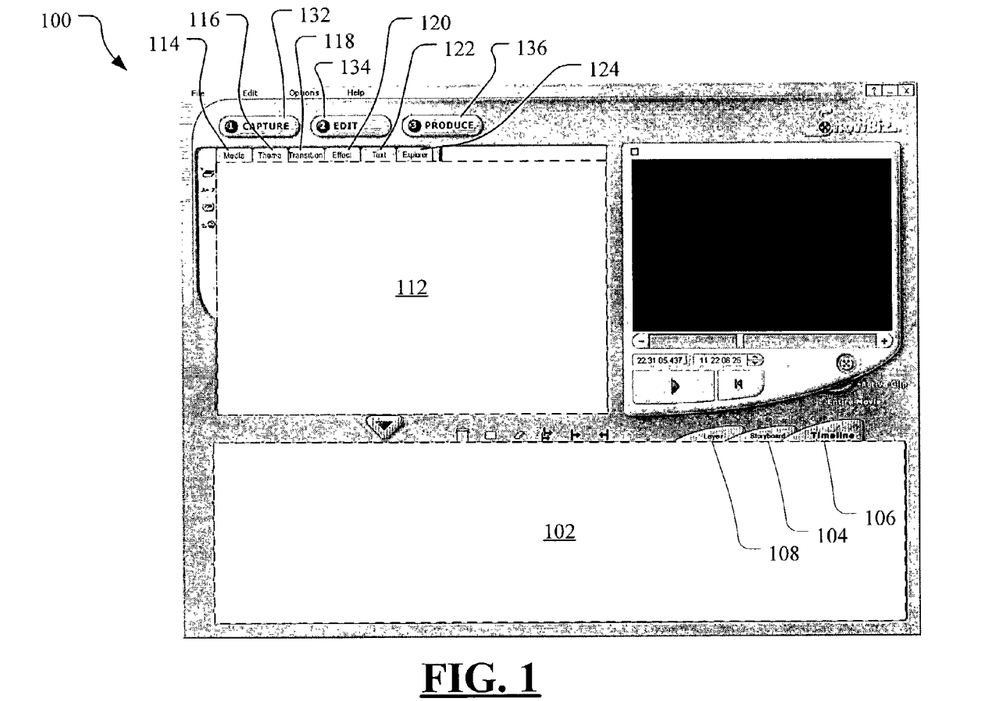
FIG. 1 illustrates a graphical user interface (GUI) of a video editor in one embodiment of the invention.

FIG. 1 illustrates a main graphical user interface 100 (hereafter "GUI 100") of a video editing software on a conventional computer. GUI 100 includes a capture button 132, an edit button 134, and a produce button 136 that allow the user to select a phase of video-editing process. By selecting capture button 132, the video editing software enters into a capture mode where interactive windows and panes are displayed for the user to import media into the video editing software. By selecting an edit button 134, the video editing software enters into an edit mode where interactive windows and panes are displayed for the user to layout a video story and its video clips. These windows and panes are described below in detail. By selecting produce button 136, the video editing software enters into a production mode where interactive windows and panes are displayed for the user to render the video story. Once selected, buttons 132, 134, and 136 also indicate the video-editing phase that the user is in.

In the edit mode, GUI 100 includes a view area 112 with a media tab 114, a theme tab 116, a transition tab 118, an effect tab 120, a text tab 122, and an explorer tab 124. The user uses view area 112 to select the clips that make up the tracks of the video story. Used herein, the term "select" or any form thereof means the act of identifying an element through a mouse, a keyboard, or any other form of input (e.g., single or double-clicking an item using a mouse). GUI 100 further includes a view area 102 with a storyboard tab 104, a timeline tab 106, and a layer tab 108. A user uses view area 102 to arrange the clips to construct the tracks of the video story.

Figure 2:
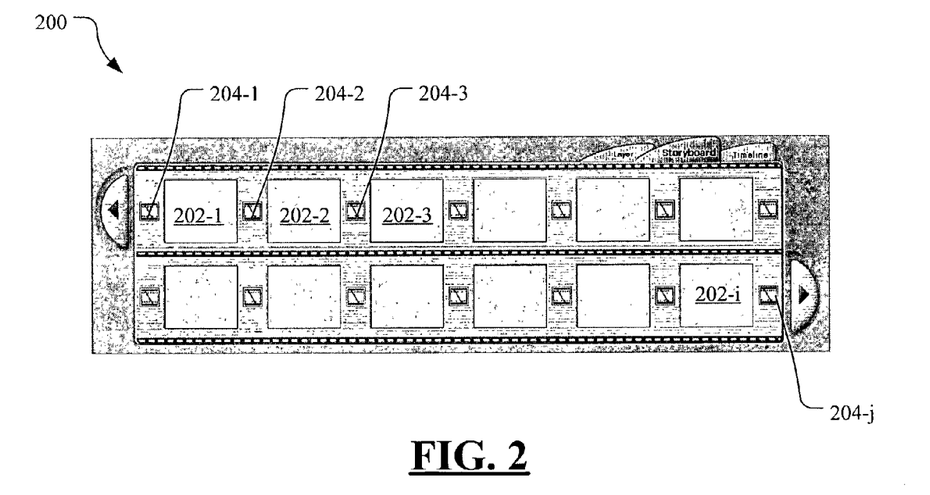
FIG. 2 illustrates a storyboard pane in the GUI of FIG. 1 in one embodiment.
Figure 6:
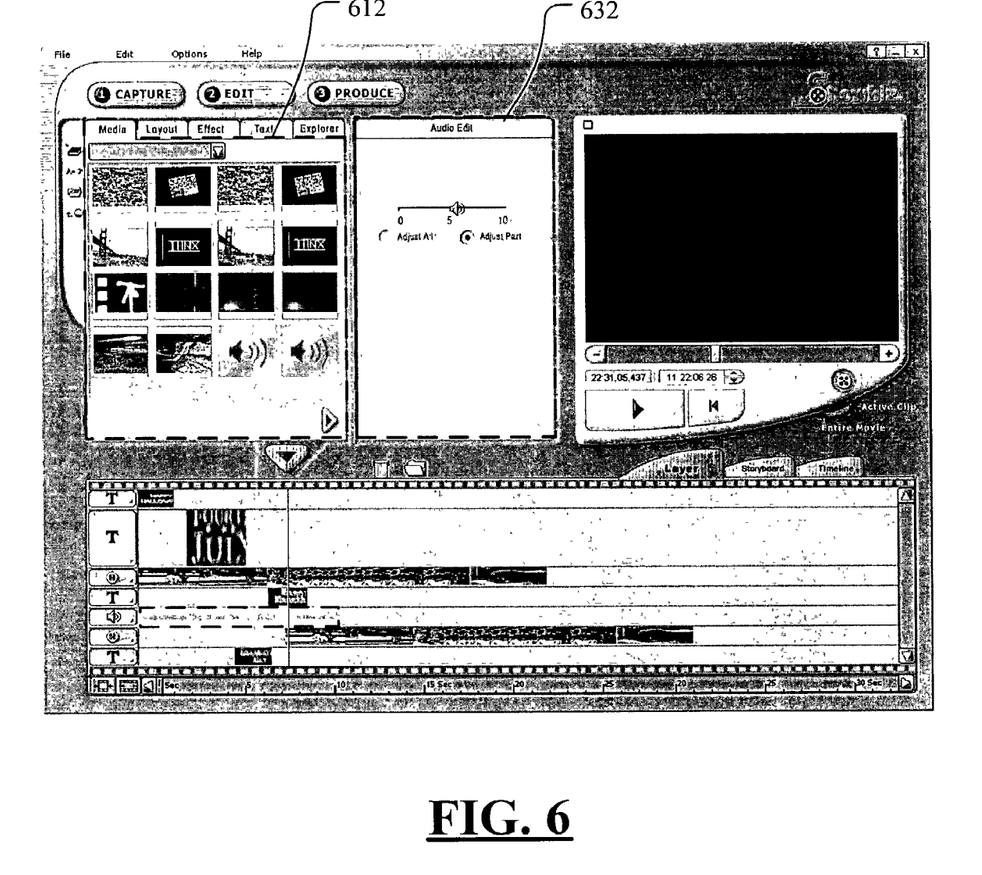
FIG. 6 illustrates a media pane and an audio layer editing pane in one embodiment.

FIG. 2 illustrates a storyboard pane 200. If the user selects storyboard tab 106, storyboard pane 200 appears in view area 102 (FIG. 1). To add a video clip, the user drags and drops the video clip from a media pane 612 (FIG. 6) into one of frames 202-1 to **202-*i* (where "i" is a variable). The user accesses media pane 612 in view area 112 (FIG. 1) by selecting media tab 114 (FIG. 1**). As discussed above, a video clip may be a video or a still image.

Figure 9:
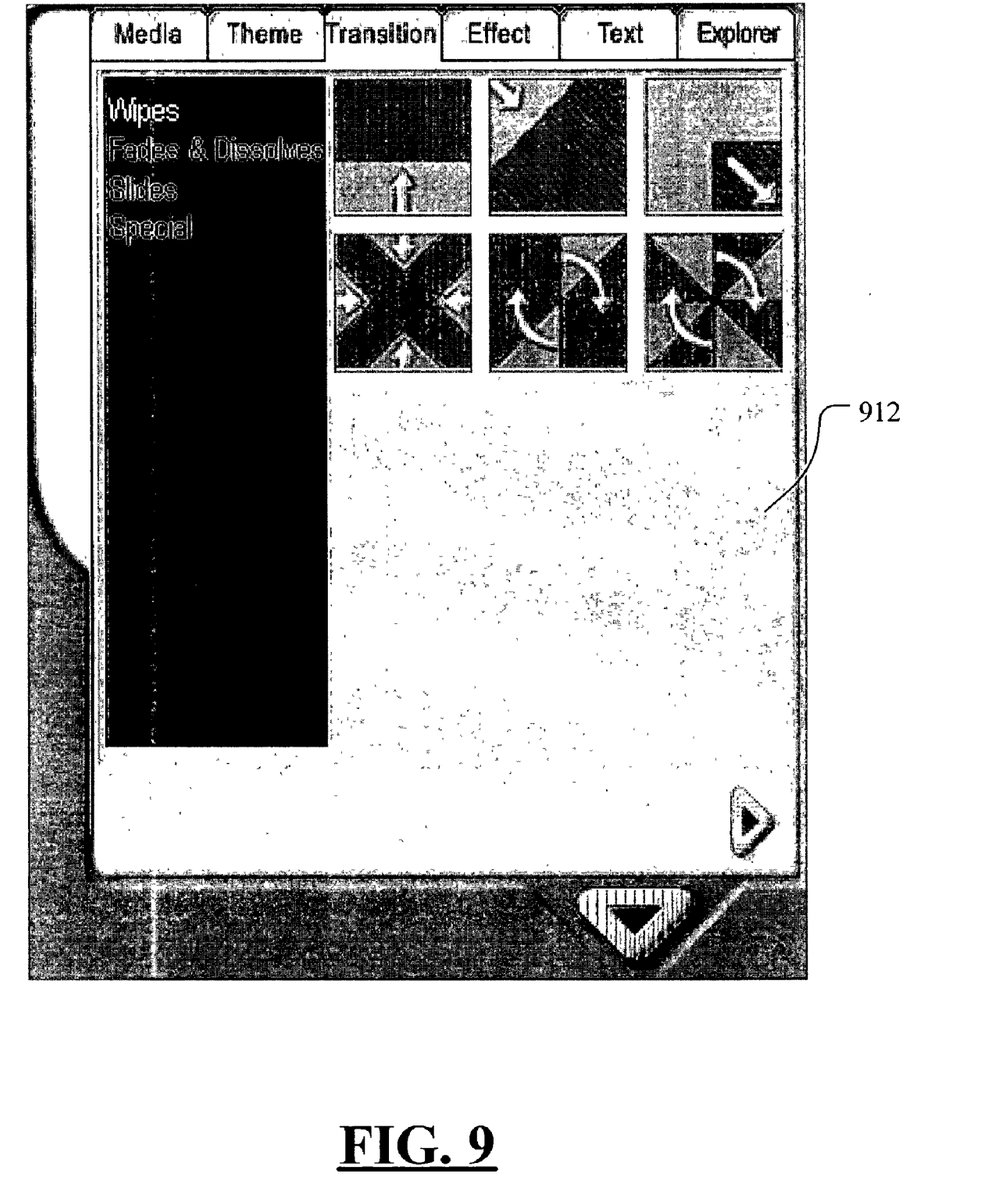
FIG. 9 illustrates a transition pane in one embodiment.

To add a transition, the user drags and drops the transition from a transition pane 912 (FIG. 9) into one of frames 204-1 to **204-*j* (where "j" is a variable). The user accesses transition pane 912 in view area 112 by selecting transition tab 118 (FIG. 1). In storyboard pane 200, the video clips and the scene transitions are arranged in the time sequence which they appear. Additional tracks of the video story are not visible in storyboard pane 200**.

Figure 3:
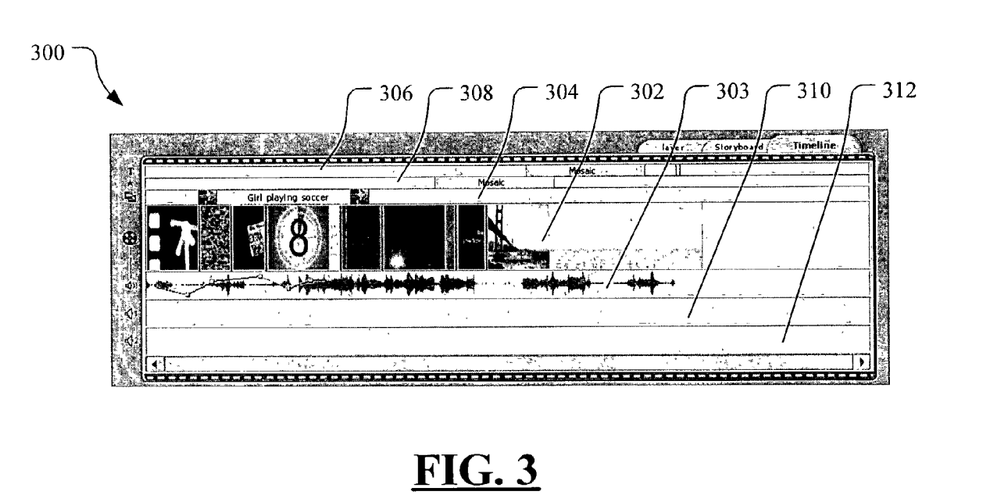
FIG. 3 illustrates a timeline pane in the GUI of FIG. 1 in one embodiment.

FIG. 3 illustrates a timeline pane 300. If the user selects timeline tab 104, timeline pane 300 appears in view area 102 (FIG. 1). Timeline pane 300 displays all the tracks in the video story. Timeline pane 300 includes a video row 302, a video-companion audio row 303, a video overlay row 304, a text row 306, an effect row 308, a first audio row 310, and a second audio row 312. Video row 302 displays the video clips and transitions between the video clips in the video story. Video-companion audio row 303 displays an audio track with audio clips preexisting in the video clips. Video overlay row 304 displays video overlay clips (e.g., a watermark image) superimposed over the video clips. Text row 306 displays the texts in the video clips. Effects row 308 displays the special effects applied to the video clips. Audio rows 310 and 312 display two audio tracks to be played along the video clips but are external to the video clips.

The user typically drags and drops clips into respective rows in the time sequence which they appear to construct the overall layout of the video story. To add a video clip, the user drags and drops the video clip from media pane 612 (FIG. 6) into video row 302. To add an overlay video clip, the user drags and drops the overlay video clip from media pane 612 into overlay video row 304. To add a transition between video clips, the user drags and drops the transition from transition pane 912 (FIG. 9) into the start or the end of a video clip in video row 302. To add a text clip, the user drags and drops the text clip from text pane 712 (FIG. 7) into text row 306. The user accesses text pane 712 in view area 112 (FIG. 1) by selecting text tab 122 (FIG. 1). To add an effect to be applied to a video clip, the user drags and drops the effect from effect pane 1012 (FIG. 10) into effect row 308. The user accesses effect pane 1012 in view area 112 by selecting effect tab 120 (FIG. 1). To add an audio clip, the user drags and drops the audio clip from media pane 612 into one of audio rows 310 and 312.

To add a theme to the video story, the user selects a theme from a theme pane. A theme is a template with predetermined transitions, texts, and effects for a video story. The user accesses the theme pane in view area 112 (FIG. 1) by selecting theme tab 116 (FIG. 1). Theme pane is similar to media pane 612 except that themes instead of media are displayed. The user may select a theme while in storyboard pane 200 and timeline pane 300.

The user selects explorer tab 118 to access an explorer window to manage all the media (video, audio, and still images), transition, text, effect, and theme files. The explorer window is similar to Windows Explorer and allows the user to manipulate (e.g., copying, moving, deleting) files and folders in a tree view.

Figure 4:
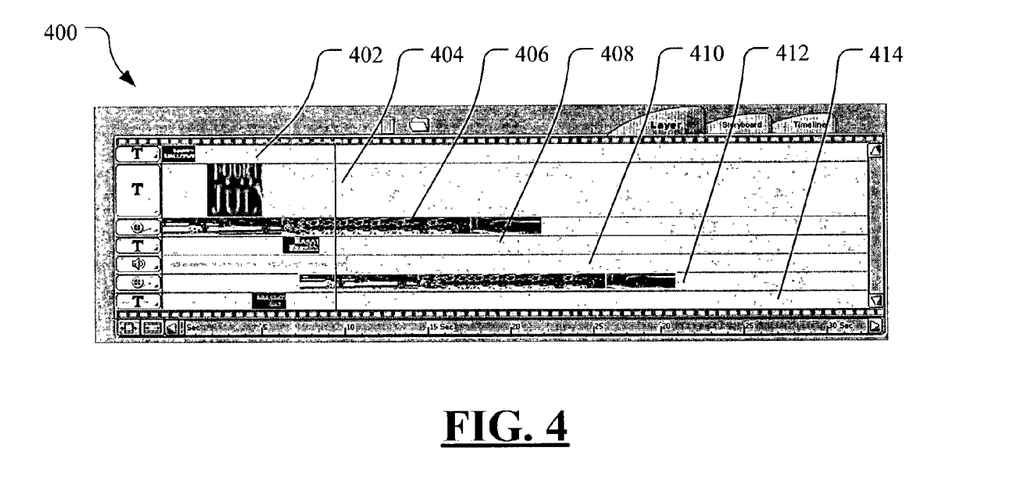
FIG. 4 illustrates a layer pane in the GUI of FIG. 1 in one embodiment.
Figure 12A:
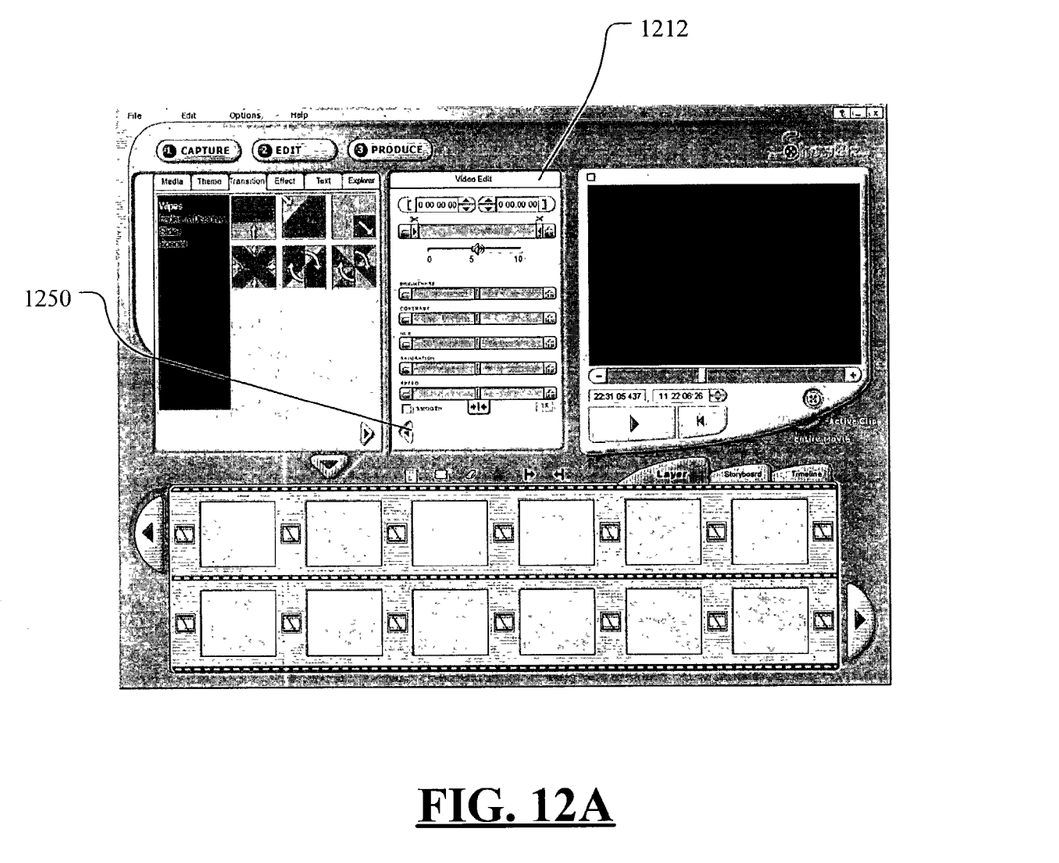
FIGS. 12A and 12B illustrate video clip editing panes in one embodiment.
Figure 12B:
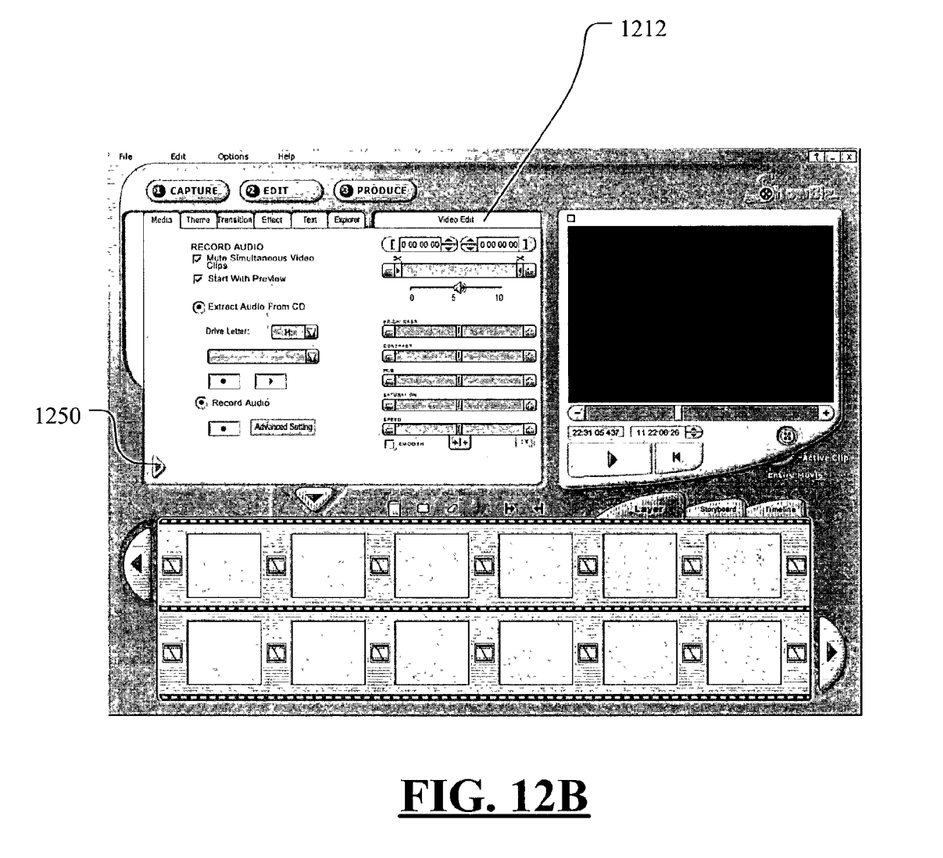

FIG. 4 illustrates a layer pane 400. When the user selects a video clip in either storyboard pane 200 (FIG. 2) or timeline pane 300 (FIG. 3), layer tab 108 (FIG. 1) becomes enabled. If the user selects layer tab 108, a layer pane 400 appears in view area 102 (FIG. 1) so the user may edit the selected video clip. Alternatively, the user can double-click a video clip in either storyboard pane 200 or timeline pane 300 to bring up layer pane 400 in view area 102 when the video clip contains multiple layers. When a video clip contains only one layer, double-clicking the video clip will bring up conventional video clip editing pane 1212A (FIG. 12A) in view area 112 instead of layer pane 400 in view area 102. Video clip editing pane 1212A can be expanded to video clip editing pane 1212B (FIG. 12B) by selecting button 1250, and vice versa. In one embodiment, any video clip initially added to storyboard pane 200 or timeline pane 300 contains only one layer, so on that occasion the user has to select layer tab to access layer pane 400. The second time the user double-clicks that video clip, the computer decides whether the video clip contains multiple layers before invoking layer pane 400 or video clip editing pane 1212 in view area 112.

Layer pane 400 displays all the layers in the selected video clip. As described above, each layer consists of only one layer clip and that layer clip can be a video, text, or audio layer clip. Depending on the number of layer clips that make up the selected video clip, layer pane 400 will displays the corresponding number of layer rows. In one example, layer pane 400 includes a first video row 406, a second video row 412, a first text row 402, a second text row 404, a third text row 408, a fourth text row 414, and an audio row 410. Video rows 406 and 412 display the two video layer clips in the selected video clip. Text rows 402, 404, 408, and 414 display the four text layer clips in the selected video clip. Audio row 410 displays the one audio layer clip in the selected video clip. In other examples, more or less layers may compose the selected video clip.

Figure 5:
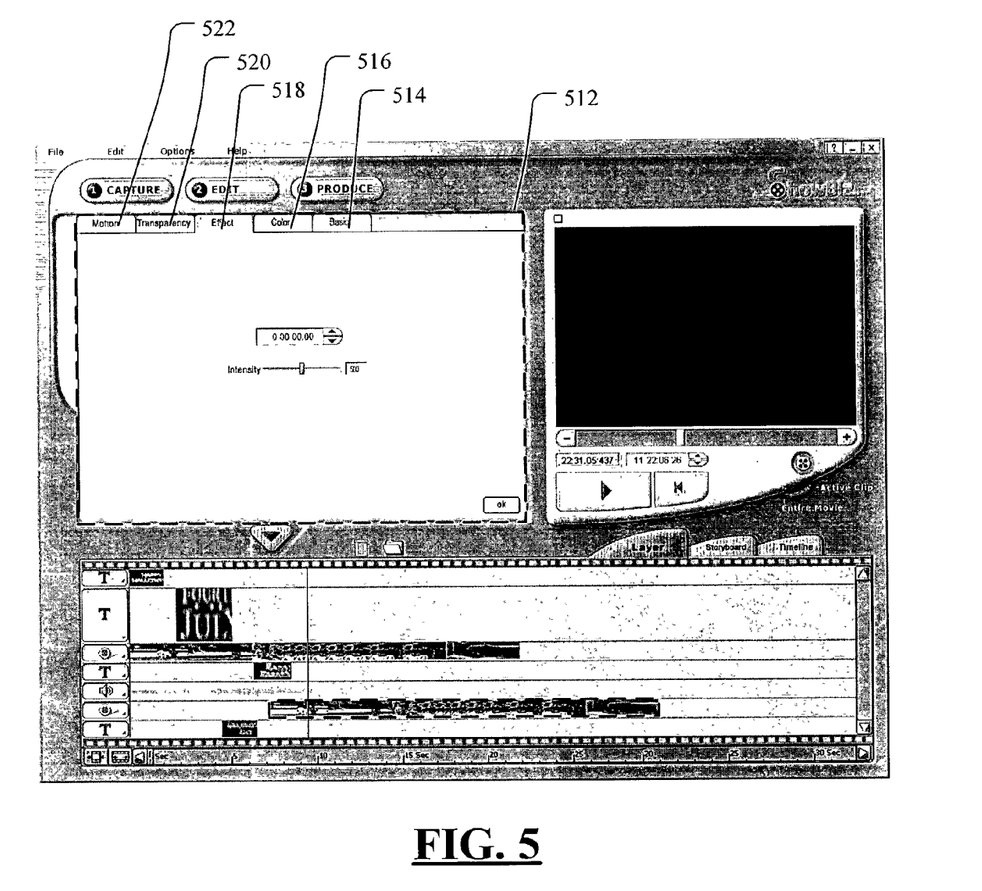
FIG. 5 illustrates a video layer editing window in one embodiment.

To add a video layer clip, the user drags and drops a video clip from media pane 612 (FIG. 6) into layer pane 400 and a video row will be created for that video layer clip. Video layer clips can be moved to different timeslots to create a non-overlapping time sequence of multiple video clips. Video layer clips can also be moved to overlapping timeslots to create an overlapping time sequence of multiple video clips. A combination of overlapping and non-overlapping sequences can be used to modify the selected video clip. To edit a video layer clip, the user selects (e.g., double-click) the video layer clip in video row 402 or 404 and a window 512 (FIG. 5) with a variety of editing tabs appears in view area 112 (FIG. 1). FIG. 5 shows that editing tabs include basic tab 514, color tab 516, effect tab 518, transparency tab 520, and motion tab 522. By selecting one of tabs 514 to 522, a corresponding pane offering a variety of video editing options appear in view area 112. A basic editing pane allows the user to trim a video layer clip, fasten or slow down playback speed, and adjust the volume of the video-companion audio track in one embodiment. A color editing tab allows the user to modify brightness, hue, saturation, and contrast in one embodiment. An effect editing pane allows the user to add video effects to the video layer clip in one embodiment. A transparency editing pane allows the user to edit the visibility of the video layer clip on the screen during playback in one embodiment. A motion editing pane allows the user to move the video layer clip across the screen along a predetermined route in one embodiment.

To add a text layer clip, the user drags and drops a text clip from text pane 712 (FIG. 7) into layer pane 400 and a text row will be created for that text layer clip. To edit a text layer clip, the user selects (e.g., double-clicks) the text layer clip in text row 406 or 408 and a text editing window 812 (FIG. 8) appears. Window 812 offers a variety of text editing options (e.g., font size, style, orientation). To return to layer pane 400 in GUI 100, the user selects a button 814 (FIG. 8) to accept the editing changes or a button 816 (FIG. 8) to cancel the editing changes.

To add an audio layer clip, the user drags and drops an audio clip from media pane 612 (FIG. 6) into layer pane 400 and an audio row will be created for that audio layer clip. To edit an audio layer clip, the user selects (e.g., double-clicks) the audio layer clip in audio row 410 or 412 and an audio editing pane 632 (FIG. 6) appears in view area 112. Audio editing pane 632 offers a variety of audio editing options. These editing options include adding audio effects such as fade-in and fade-out, and change the volume.

Figure 7:
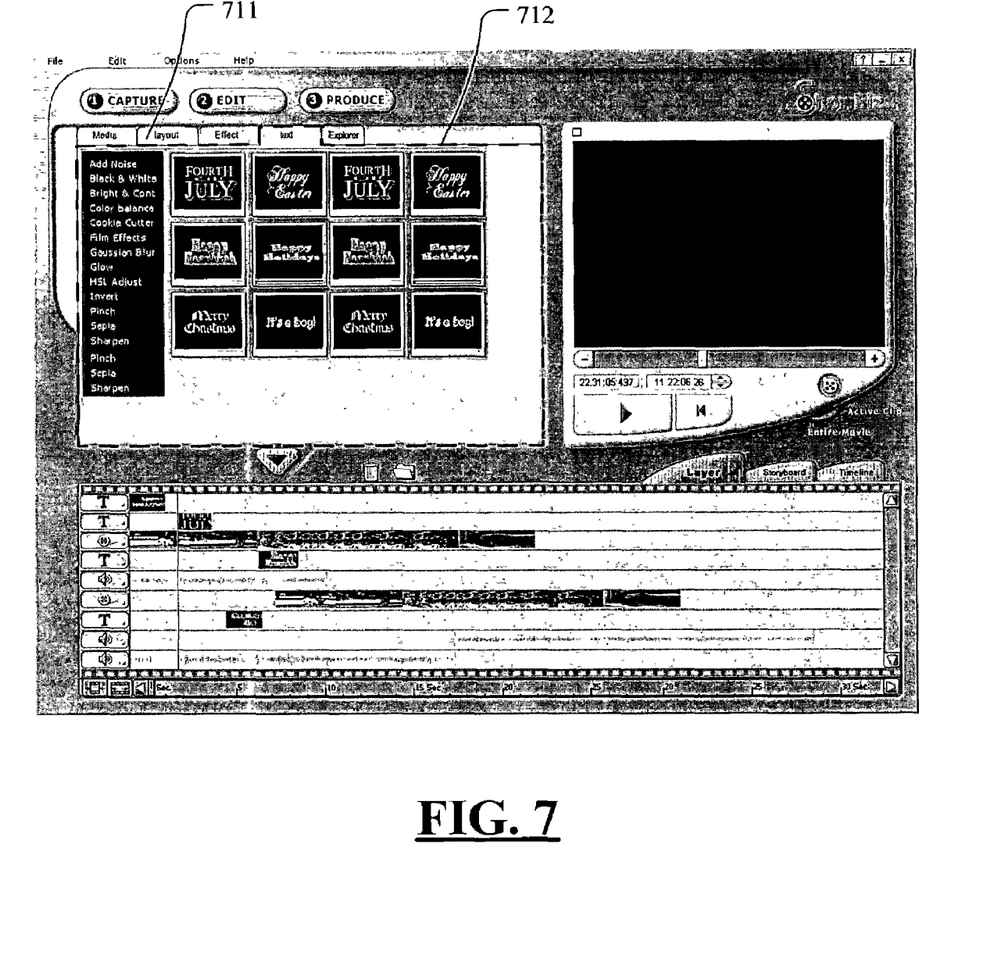
FIG. 7 illustrates a text pane in one embodiment.
Figure 8:
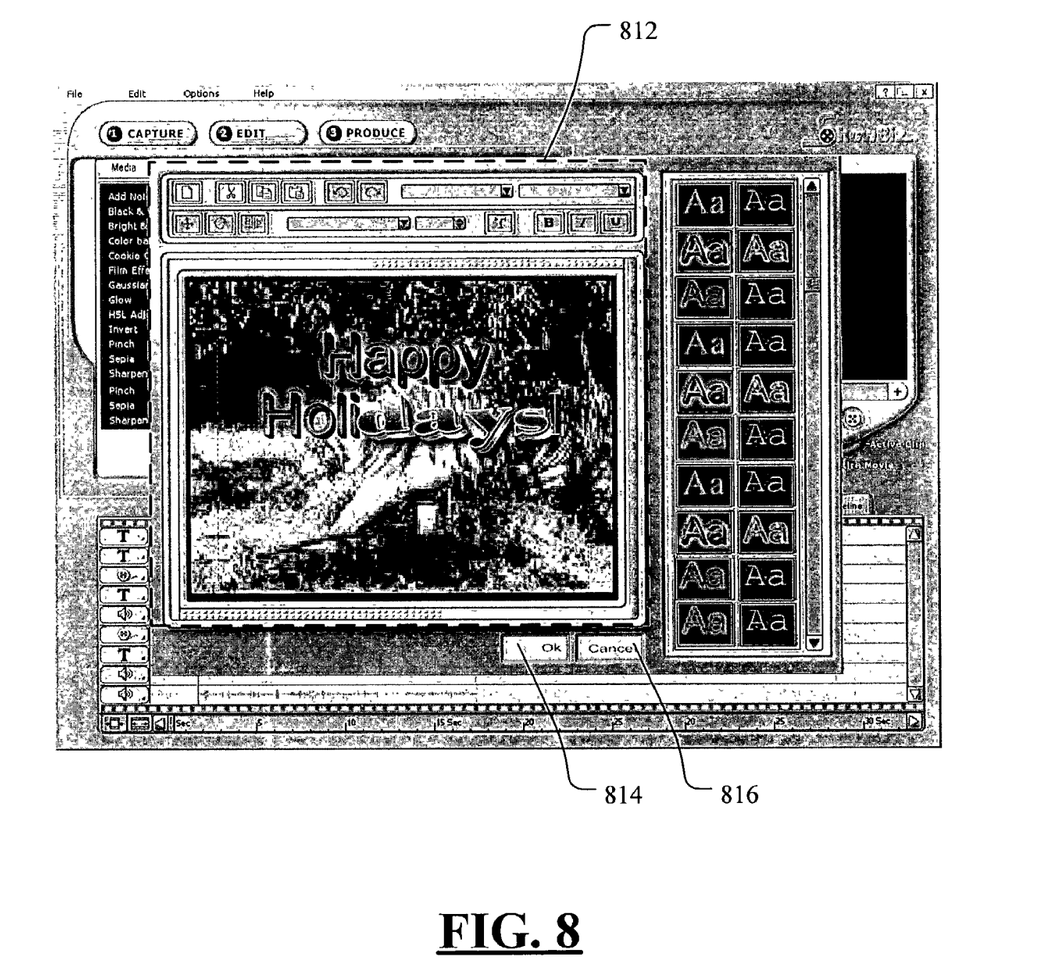
FIG. 8 illustrates a text layer editing window in one embodiment.

To add a layout to the selected video clip, the user selects the layout from a layout pane. Similar to a theme for a video story, a layout is a template with predetermined arrangement of video, audio, and text layer clips. The user accesses the layout pane in view area 112 (FIG. 1) by selecting layout tab 711 (FIG. 7). Layout pane is similar to media pane 612 except that layouts instead of media are displayed.

Figure 11A:
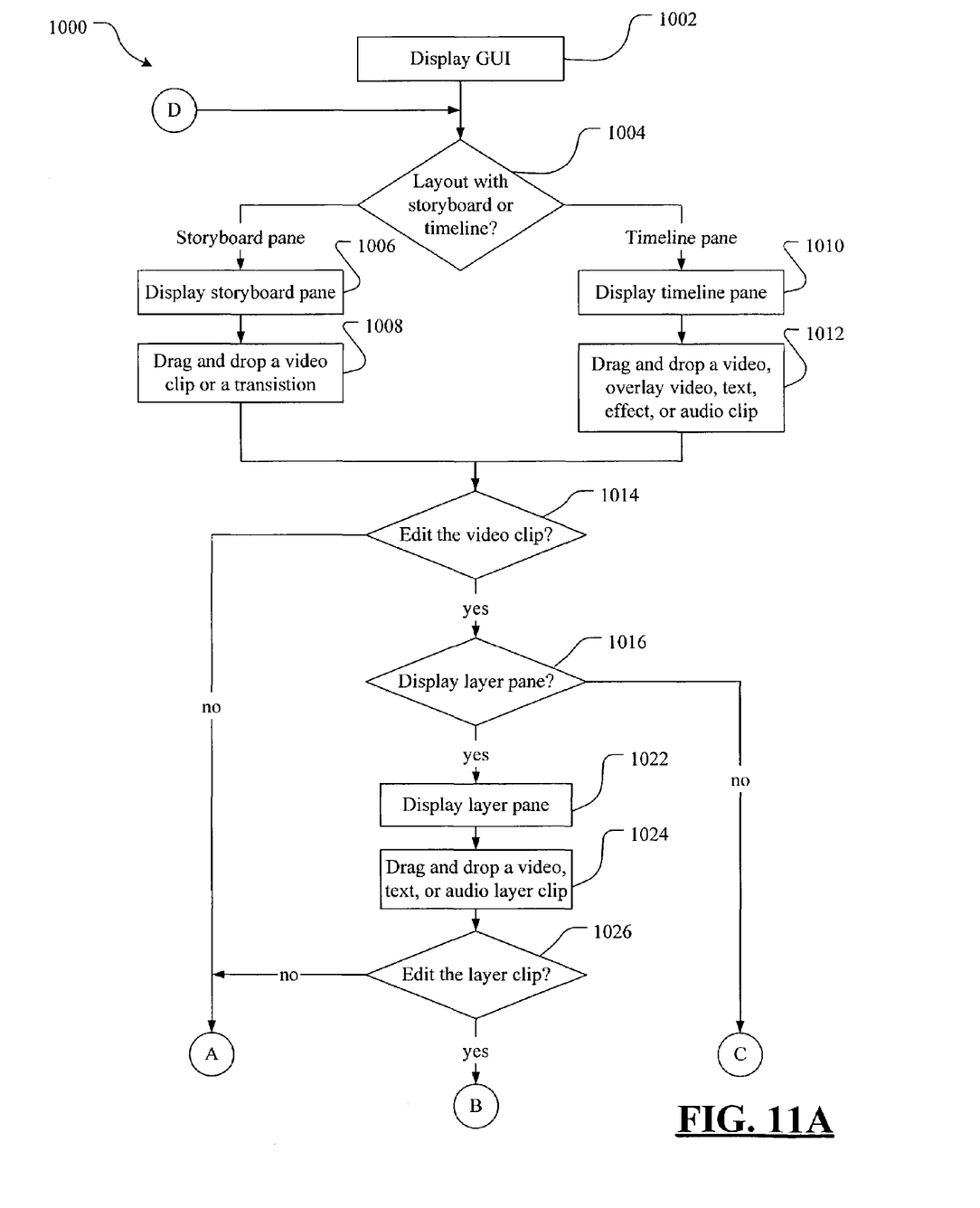
FIGS. 11A and 11B illustrates a method for editing a video story in one embodiment of the invention.
Figure 11B:
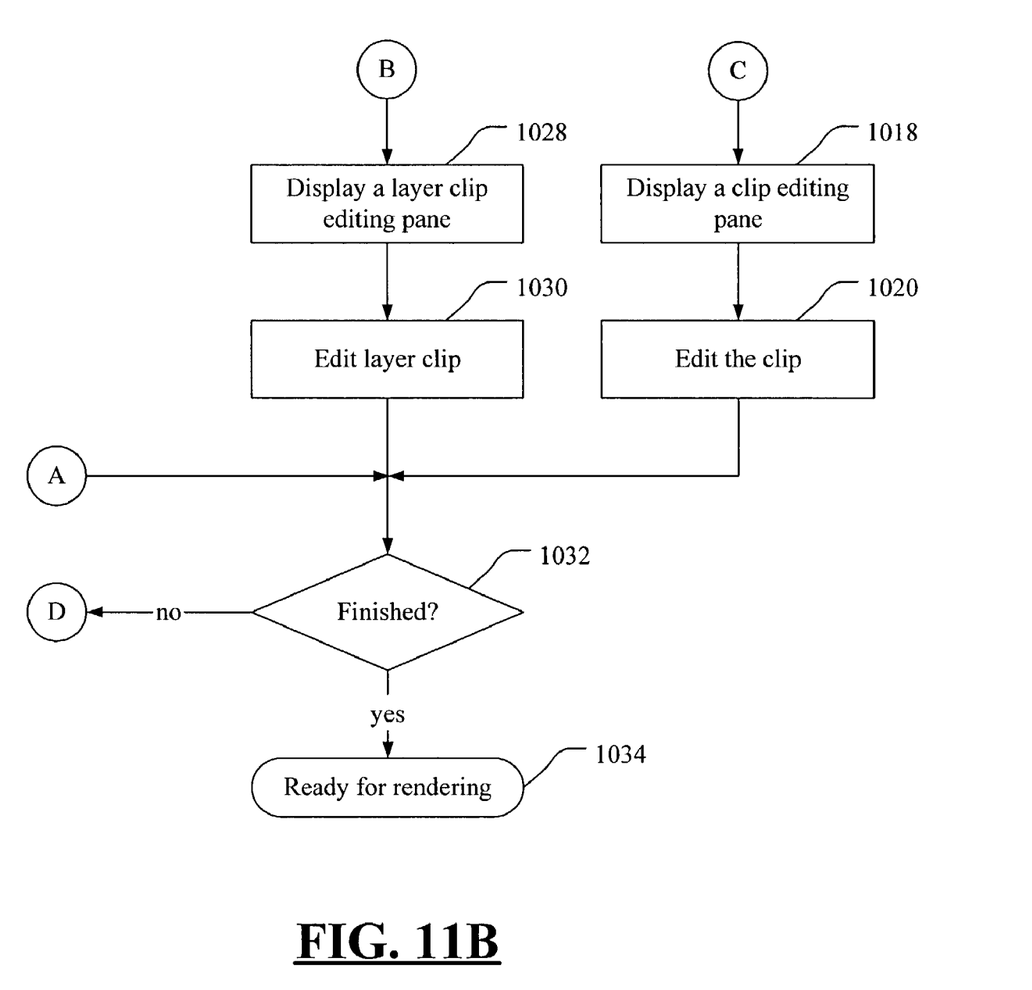

FIGS. 11A and 11B illustrates a method 1000 for editing a video story using GUI 100. In action 1002 (FIG. 11A), the computer displays GUI 100. In action 1004, the computer determines from a user input whether to layout the video story with storyboard pane 200 (FIG. 2) or with timeline pane 300 (FIG. 3). As described above, the user can select a storyboard tab 104 or a timeline tab 106 to select the corresponding pane. If the user selects to layout the video story with storyboard pane 200, then action 1004 is followed by action 1006. If the user selects to layout the video story with timeline pane 300, then action 1004 is followed by action 1010.

In action 1006, the computer displays storyboard pane 200 in view area 102 (FIG. 1). Action 1006 is followed by action 1008. In action 1008, the computer receives a user selection of a video clip or a scene transition. As described above, the user can drag and drop the video clip or transition from media pane 612 (FIG. 6) or transition pane 912 (FIG. 9) in view area 112 (FIG. 1). Action 1008 is followed by action 1014.

Figure 10:
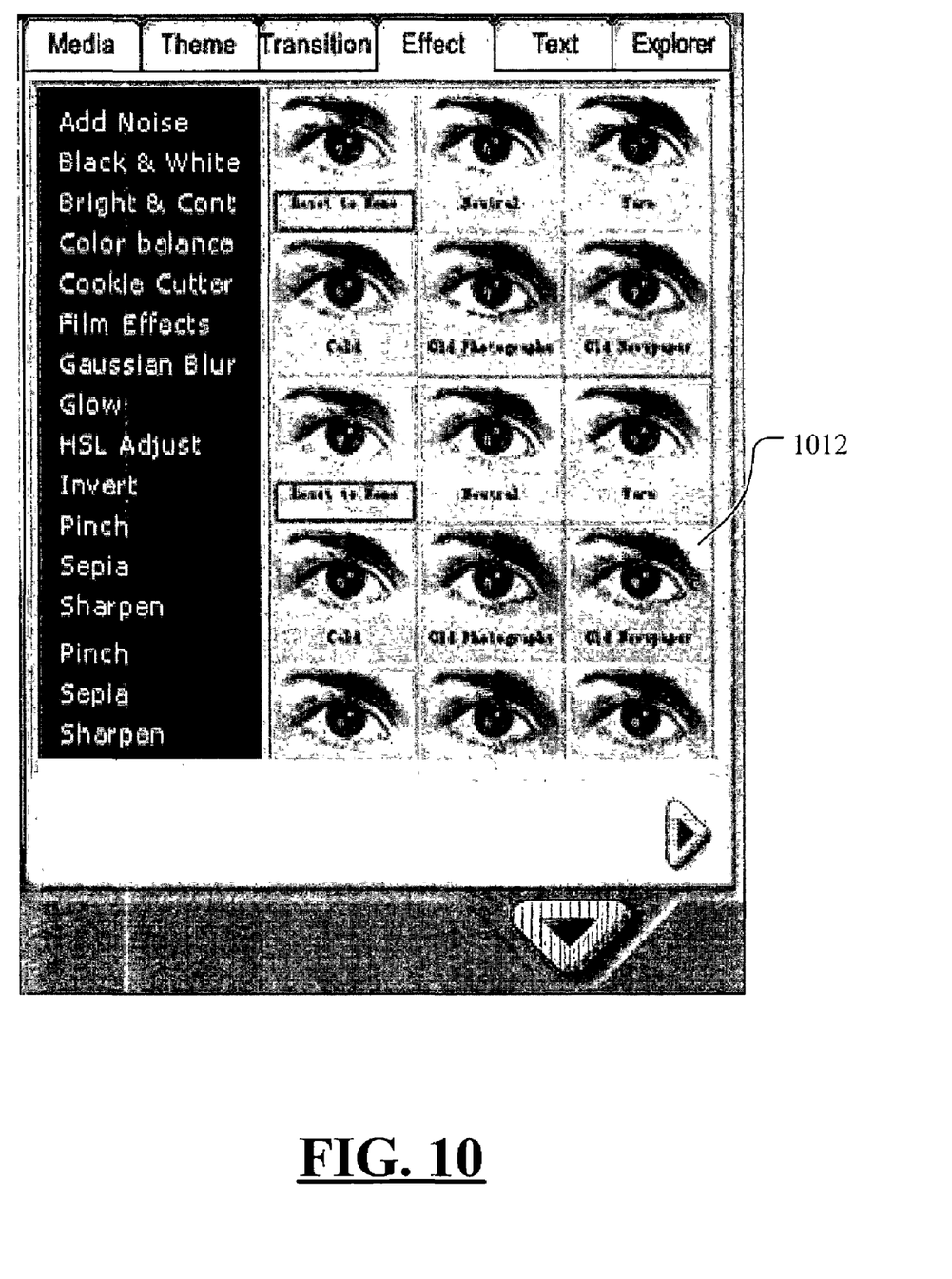
FIG. 10 illustrates an effect pane in one embodiment.

In action 1010, the computer displays timeline pane 300 in view area 102. Action 1010 is followed by action 1012. In action 1012, the computer receives a user selection of a video, an overlay video, a text, an effect, or an audio clip. As described above, the user can drag and drop the clip from media pane 612, text pane 712 (FIG. 7), or effect pane 1012 (FIG. 10). Action 1012 is followed by action 1014.

In action 1014, the computer determines from a user input whether or not to edit a video clip. If yes, action 1014 is followed by action 1016. If no, action 1014 is followed by action 1018 (FIG. 11B). As described above, the user can select a video clip and then select layer button 108 to edit the video clip. Alternatively the user can double-click the video clip in storyboard pane 200 or timeline pane 300.

In action 1016, the computer determines if it should display layer pane 400 (FIG. 4). As described above, the computer would display layer pane 400 if the user selects a video clip and then selects layer button 108. The computer would also display layer pane 400 if the user double-clicks a video clip in storyboard pane 200 or timeline pane 300 if the video clip contains more than one layer. If the computer displays layer pane 400, action 1016 is followed by action 1028. The computer would display a video clip editing pane 1212 instead of layer pane 400 if the user double-clicks video clip in storyboard pane 200 or timeline pane 300 if the video clip contains only one layer. If the computer displays video clip editing pane 1212 instead of layer pane 400, action 1016 is followed by action 1018 (FIG. 11B).

In action 1018, the computer displays video clip editing pane 1212. Action 1018 is followed by action 1020. In action 1020, the computer receives user input on editing the selected video clip. Action 1020 is followed by action 1032.

In action 1022 (FIG. 11A), the computer displays layer pane 400 (FIG. 4). In action 1024, the computer receives a user selection of a video, a text, or an audio layer clip. As described above, the user can drag and drop the layer clip from media pane 612 and text pane 712. In action 1026, the computer determines from a user input whether or not to edit the layer clip. If yes, action 1026 is followed by action 1028 (FIG. 11B). If no, action 1026 is followed by action 1032 (FIG. 11B). As described above, the user can select a layer clip in layer pane 400 to edit that layer clip.

In action 1028, the computer displays a corresponding editing window or pane for the selected layer clip. For example, if the user selected a video layer clip, the computer displays video editing window 512. The user could also select a predetermined layout in the layout pane. Action 1028 is followed by action 1030. In action 1030, the computer receives user input on editing the selected layer clip. Action 1030 is followed by action 1032.

In action 1032, the computer determined if the user has finished the layout of the video story and its video clips. If yes, action 1032 is followed by action 1034 where the video story is ready to be rendered. If no, action 1032 is followed by action 1004 (FIG. 11A) where the user continues to layout and to edit the video story. The user has finished the layout of the video story and its video clips when he or she selected produce button 136 to render the entire story chain.

Various other adaptations and combinations of features of the embodiments disclosed are within the scope of the invention. Numerous embodiments are encompassed by the following claims.

What is claimed is:

1. A graphical user interface for editing a video story in an editing mode, comprising a view area alternatively displaying a storyboard pane, a timeline pane, and a layer pane, wherein:

the storyboard pane displays video clips of the video story;

the timeline pane comprises tracks of the video story, the tracks including a video track displaying the video clips; and the layer pane comprises layers of a single video clip selected from the video clips, the layers displaying layer clips, wherein each layer displays a single layer clip.

2. The graphical user interface of claim 1, wherein each layer clip is a video layer clip, a text layer clip, or an audio layer clip.

3. The graphical user interface of claim 2, wherein two of the layer clips are in different timeslots in their respective layers to form a non-overlapping time sequence.

4. The graphical user interface of claim 2, wherein two of the layer clips are in overlapping time slots in their respective layers to form an overlapping time sequence.

5. The graphical user interface of claim 2, further comprising a video editing pane comprising an editing option for the video layer clip in the layer pane.

6. The graphical user interface of claim 5, further comprising a text editing pane comprising an editing option for the text layer clip in the layer pane.

7. The graphical user interface of claim 6, further comprising an audio editing pane comprising an editing option for the audio layer clip in the layer pane.

8. The graphical user interface of claim 7, further comprising another view area, wherein one of the video editing pane, the text editing pane, and the audio editing pane is alternatively displayed in the another view area when a corresponding layer clip is selected in the layer pane.

9. The graphical user interface of claim 1, further comprising a plurality of tabs for the view area, wherein only one of the storyboard pane and the timeline pane is displayed in the view area when a corresponding storyboard or timeline tab is selected.

10. The graphical user interface of claim 9, wherein the layer pane is displayed in the view area when a video clip is selected in the storyboard pane or the timeline pane and a corresponding layer tab is selected.

11. The graphical user interface of claim 9, wherein the layer pane is displayed in the view area when a video clip is double-clicked in the storyboard pane or the timeline pane.

12. The graphical user interface of claim 9, wherein the layer pane is displayed in the view area when a video clip is double-clicked in the storyboard pane or the timeline pane and the double-clicked clip comprises more than one layer.

13. The graphical user interface of claim 1, wherein the storyboard pane further displays transitions between the video clips.

14. The graphical user interface of claim 1, wherein the tracks further comprise:
- a video overlay track comprising video overlay clips;
- a text track comprising text clips;
- an effect track comprising effects; and
- an audio track comprising audio clips.

15. The graphical user interface of claim 14, further comprising a media pane displaying the video clips and die audio clips that can be placed into the tracks of the video story and the layers of the video clips.

16. The graphical user interface of claim 15, further comprising a transition pane displaying the transitions that can be placed into the video track.

17. The graphical user interface of claim 16, further comprising an effect pane displaying the effects that can be placed into the effect track.

18. The graphical user interface of claim 17, further comprising a text pane displaying the text clips that can be placed into the text track.

19. The graphical user interface of claim 18, further comprising a theme pane displaying themes that can be applied to the video story.

20. The graphical user interface of claim 19, further comprising another view area and a plurality of tabs, wherein one of the media pane, the transition pane, the effect pane, the text pane, and the theme pane is alternatively displayed in the another view area when a corresponding tab is selected.

21. A method for editing a video story, comprising:
entering an editing mode;
alternatively displaying a storyboard pane, a timeline pane, and a layer pane in a view area of the editing mode, wherein:
the storyboard pane displays video clips of the video story;
the timeline view comprises tracks of the video story, the tracks including a video track displaying the video clips; and the layer pane comprises layers of a single video clip selected from the video clips, the layers displaying layer clips, wherein each layer displays a single layer clip.

22. The method of claim 21, wherein each layer clip is a video layer clip, a text layer clip, or an audio layer clip.

23. The meted of claim 22, further comprising displaying two of the layer clips in different timeslots in their respective layers to form a non-overlapping time sequence.

24. The method of claim 22, further comprising displaying two of the layer clips in overlapping time slots in their respective layers to form an overlapping time sequence.

25. The method of claim 21, wherein said displaying a storyboard pane occurs after detecting a selection of a storyboard tab.

26. The method of claim 21, wherein said displaying a timeline pane occurs after detecting a selection of a timeline tab.

27. The method of claim 21, wherein said displaying a layer pane occurs after detecting a selection of a video clip and a layer tab.

28. The method of claim 21, wherein said displaying a layer pane occurs after detecting a double-click of a video clip in the storyboard pane or a timeline pane.

29. The method of claim 21, wherein said displaying a layer pane occurs after detecting a double-click of a video clip in the storyboard pane or a timeline pane and the double-clicked video clip comprises more than one layer.

30. The method of claim 21, further comprising displaying a video editing pane, wherein the video editing pane comprises an editing option for the video layer clip in the layer pane.

31. The method of claim 30, further comprising displaying a text editing pane, wherein the text editing pane comprises an editing option for the text layer clip in the layer pane.

32. The method of claim 31, further comprising displaying an audio editing pane, wherein the audio editing pane comprises an editing option for the audio layer clip in the layer pane.

33. The method of claim 32, wherein one of the video editing pane, the text editing pane, and the audio editing pane is alternatively displayed in another view area when a corresponding layer clip is selected in the layer pane.

34. The method of claim 21, wherein the storyboard pane further comprises transitions between the video clips.

35. The method of claim 21, wherein the tracks further include:
- a video overlay track displaying video overlay clips;
- a text track displaying text clips;
- an effect track displaying effects; and
- an audio track displaying audio clips.

36. The method of claim 35, further comprising displaying a media pane, wherein the media pane displays the video clips and the audio clips that can be placed into the tracks of the video story and the layers of the clips.

37. The method of claim 36, further comprising displaying a transition pane, wherein the transition pane displays the transitions that can be placed into the video track.

38. The method of claim 37, further comprising displaying an effect pane, wherein the effect pane displays the effects that can be placed into the effect track.

39. The method of claim 38, further comprising displaying a text pane, wherein the text pane displays the text clips that can be placed into the text track.

40. The method of claim 39, further comprising displaying a theme pane, wherein the theme pane displays themes that can be applied to the video story.

41. The method of claim 40, wherein one of the media pane, the transition pane, the effect pane, the text pane, and the theme pane is alternatively displayed in the another view area when a corresponding tab is selected.

* * * * *